No. 745,229. PATENTED NOV. 24, 1903.
W. A. McDONALD.
CALIPERS.
APPLICATION FILED JULY 13, 1903.
NO MODEL.
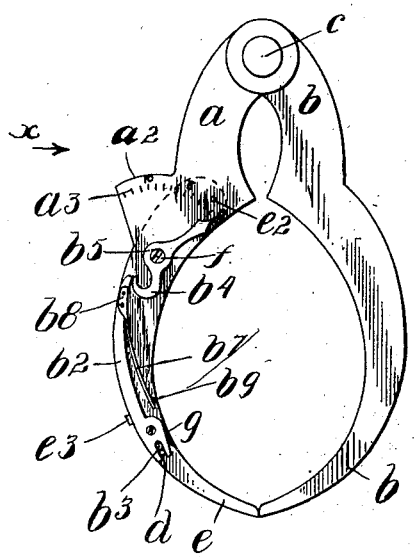
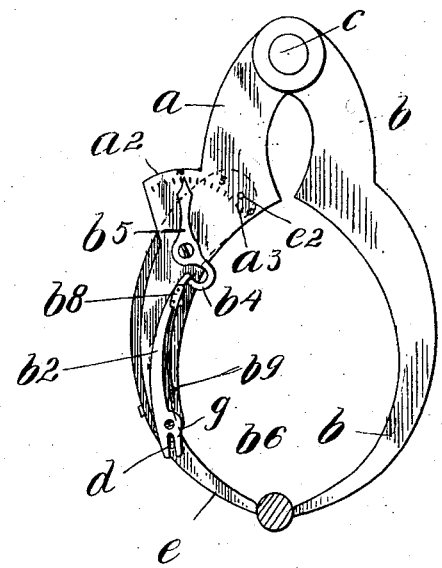
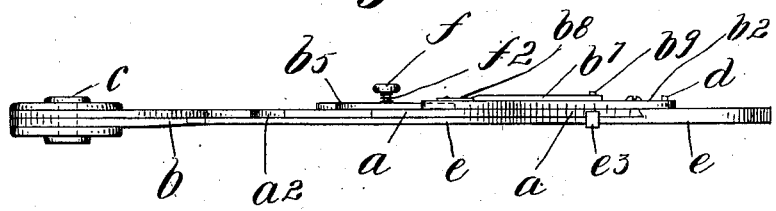
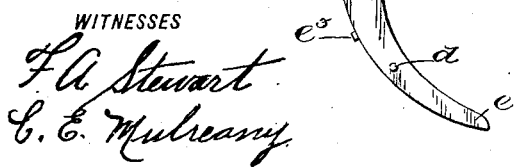
WITNESSES
F. A. Stewart
C. E. Mulreany
William A. McDonald
INVENTOR
BY Edgar Tate & Co
ATTORNEYS No. 745,229. Patented November 24, 1903.

UNITED STATES PATENT OFFICE.

WILLIAM A. MCDONALD, OF GARFIELD, NEW JERSEY.

CALIPERS.

SPECIFICATION forming part of Letters Patent No. 745,229, dated November 24, 1903.

Application filed July 13, 1903. Serial No. 165,223. (No model.)

*To all whom it may concern:*

Be it known that I, WILLIAM A. MCDONALD, a citizen of the United States, residing at Garfield, in the county of Bergen and State of New Jersey, have invented certain new and useful Improvements in Calipers, of which the following is a specification, such as will enable those skilled in the art to which it appertains to make and use the same.

My invention relates to improvements in calipers and comprises two arms pivotally connected, one of which arms is provided with a secondary swinging arm and a lever to operate an index-hand to indicate upon a scale the gage or size of the opening between the adjacent points of the caliper-arms.

The object of my invention is to provide a caliper of the character described which will readily indicate upon a scale formed upon the caliper the size of the opening between the ends of the caliper arms or gage of the object measured.

The invention is fully disclosed in the following specification, of which the accompanying drawings form a part, in which the separate parts of my improvement are designated by suitable reference characters in each of the views, and in which—

Figure 1 is a side view of my improved calipers; Fig. 2, a similar view which shows the ends of the arms separated and measuring an object; Fig. 3, an enlarged end view of Fig. 1 looking in the direction indicated by the arrow $x$. Fig. 4 is a detail view of a part of the device detached.

In the practice of my invention I provide the arms $a$ and $b$, which are held together at $c$, and upon the arm $a$ I form an extension $a^2$, which with a portion of the said arm forms a scale which is suitably marked with graduations $a^3$. The arm $a$ terminates at $g$, and at this point I pivotally attach a finger $b^2$, the upper end of which is adapted to engage the end $b^4$ of an index-hand $b^5$, pivotally attached to the arm $a$. The lower end of the finger $b^2$ is formed with a recess which engages a pin $d$, which is fastened to the secondary arm $e$. This secondary arm $e$ is pivotally attached to the arm $a$ at $e^2$ and is provided with a stop $e^3$, which engages the back of the arm $a$, as clearly illustrated in Fig. 3. To keep the finger $b^2$ normally in its outermost position, I employ a spring $b^7$, which is secured to the finger at $b^8$ and engages a pin $b^9$, which is fastened to the arm $a$. The index-hand $b^5$ is held upon the arm $a$ by means of a screw or pin $f$, and engaging between the head of the set-screw and index-hand $b^5$ I provide a spring $f^2$, which is adapted to keep the said index-hand flat against the face of the scale.

In the operation of my device when it is desired to find the gage or thickness of wire or other material the said material is forced between the ends of the arm $b$ and the secondary arm $e$, thereby forcing the said secondary arm $e$ outward, and actuating the finger $b^2$ moves the index-hand $b^5$ until it indicates upon the scale the thickness of the material measured in the proper way. When the object measured has been removed from the ends of the arms $b$ and $e$, the action of the spring $b^7$ will bring the ends of the arms $b$ and $e$ together to their normal position, as shown in Fig. 1.

This device is simple in construction and operation and comparatively inexpensive, and various changes in and modifications of the construction herein described may be made without departing from the spirit of my invention or sacrificing its advantages.

Having fully described my invention, what I claim as new, and desire to secure by Letters Patent, is—

1. In a caliper, two arms attached at one end, one of which is provided with a scale, a secondary arm pivotally connected to one of the arms, an index-hand attached to said arm and operating in conjunction with said scale, a lever pivotally attached to the said arm and adapted to operate the said index-hand, means for operating the said lever in conjunction with the said pivotal arm and means for keeping the ends of one of the arms and the secondary pivoted arm normally together, substantially as shown and described.

2. In a caliper, two arms attached at one end, one of which is provided with a scale, a secondary arm pivotally connected to one of the arms, an index-hand attached to said arm and operating in conjunction with said scale, a lever pivotally attached to the said arm and adapted to operate the said index-hand, a pin formed upon the said secondary arm and adapted to engage in a slot formation upon the end of the said lever to actuate the same during the movement of said secondary arm, substantially as shown and described.

3. In a caliper, two arms attached at one end, one of which is provided with a scale, a secondary arm pivotally connected to one of the arms, an index-hand attached to said arm and operating in conjunction with said scale, a lever pivotally attached to the said arm and adapted to operate the said index-hand, a pin formed upon the said secondary arm and adapted to engage in a slot formation upon the ends of the said lever to actuate the same during the movement of said secondary arm, means for operating the said lever in conjunction with the said pivotal arm and means for keeping the ends of one of the arms and the secondary pivoted arm normally together, substantially as shown and described.

In testimony that I claim the foregoing as my invention I have signed my name, in presence of the subscribing witnesses, this 11th day of July, 1903.

WILLIAM A. MCDONALD.

Witnesses:
F. A. STEWART,
C. E. MULREANY.